United States Patent [19]

Eisenhauer et al.

[11] 4,148,440
[45] Apr. 10, 1979

[54] APPARATUS FOR THE RELEASE OF THE JACKET MATERIAL OF ROD-SHAPED CARRIERS AND RECOVERY OF THE SAME, PARTICULARLY OF WASTE WELDING RODS

[75] Inventors: Rüdolf Eisenhauer; Helmut Haas; Friedhelm Haude, all of Cologne; Jürgen Greifenberg, Bensberg-Refrath, all of Fed. Rep. of Germany

[73] Assignee: Klöckner-Humboldt-Deutz AG, Fed. Rep. of Germany

[21] Appl. No.: 762,753

[22] Filed: Jan. 26, 1977

[30] Foreign Application Priority Data

Feb. 14, 1976 [DE] Fed. Rep. of Germany ....... 2606010

[51] Int. Cl.$^2$ .................... B02C 17/02; B02C 17/14
[52] U.S. Cl. ........................................ 241/54; 241/74; 241/79.1; 241/175
[58] Field of Search .............. 241/47, 48, 54, 69, 241/74, 78, 79, 79.1, 91, 140, 153, 175

[56] References Cited

U.S. PATENT DOCUMENTS

| | | | |
|---|---|---|---|
| 1,455,456 | 5/1923 | Sweet et al. | 241/91 |
| 2,960,324 | 11/1960 | Culp | 241/48 |
| 3,396,913 | 8/1968 | Jackering | 241/78 |
| 3,510,074 | 5/1970 | Edwards et al. | 241/153 |
| 3,865,318 | 2/1975 | Gammerler et al. | 241/175 |
| 3,971,515 | 7/1976 | Haas et al. | 241/175 |
| 4,085,898 | 4/1978 | Jacubasch | 241/175 |

Primary Examiner—Howard N. Goldberg
Attorney, Agent, or Firm—Hill, Gross, Simpson, Van Santen, Steadman, Chiara & Simpson

[57] ABSTRACT

The jacket material of welding rods is removed and processed for reuse, and the rods are cleaned and processed for reuse by delivering the jacketed rods to a ball mill, grinding the jackets from the rods within the ball mill by oscillating the jacketed rods in the environment of equally long cylindrical grinding bodies while holding the rods and the grinding bodies against axial movement and in generally parallel disposition with respect to one another. The detached jacket material is conveyed continuously from the grinding chamber and further comminuted, the transport of the ground material being supported by flowing a fluid through the grinding chamber. The fluid may be a gas or a liquid and may contain a chemical reacting agent for an after treatment. The fluid may advantageously be circulated, freed from the solid material transported thereby, regenerated and/or heated. Both neutral and chemically reacting fluids may be alternately employed, depending on the particular materials involved.

12 Claims, 3 Drawing Figures

APPARATUS FOR THE RELEASE OF THE JACKET MATERIAL OF ROD-SHAPED CARRIERS AND RECOVERY OF THE SAME, PARTICULARLY OF WASTE WELDING RODS

BACKGROUND OF THE INVENTION

1. Field of the Invention

The present invention relates to a apparatus for the release of the jacket material of rod-shaped carriers and for the recovery of the material, and the carriers for reuse, and more particularly to the removal of jacket material of waste welding electrodes in which the jacketed rod-shaped carriers are delivered chargewise to a ball mill and the unsheathed rods are taken chargewise from the mill, while the released jacket material is conveyed from the grinding chamber and, if necessary, further comminuted.

2. Description of the Prior Art

Heretofore it has been attempted to recover the jacket material of waste welding rods in squeezing or striking comminution machines. This technique, however, has the disadvantage that the rod-shaped carriers become bent or shattered and must be scrapped. As with automatically controlled production lines for welding rods, always greater quantities of reject electrodes occur, the most complete and economical recovery of the jacket material and the carriers becomes more important, along with the preparation of the jacket materials.

In U.S. patent application Ser. No. 712,942, filed Aug. 9, 1976, issued Apr. 25, 1978 as U.S. Pat. No. 4,085,898, and assigned to the same assignee as the present invention, the removal of the jacket material by a new and unique technique is disclosed in which the welding electrodes are placed in grinding chambers of substantially equal length to the electrodes, the grinding chamber being filled to about 40% of its volume with grinding rods. The chamber is perforate to permit the broken jacket material to fall therethrough for removal through a discharge conduit as the chamber is oscillated.

SUMMARY OF THE INVENTION

The primary object of the present invention is to improve the removal of jacket material, in particular welding rod jacket material, over the method and apparatus set forth in the above-identified application so as to provide a more economical recovery of the rods along with the simultaneous comminution of the jacket material.

According to the invention, the above object is achieved in that a fluid is conveyed through the grinding chamber to support the transport and discharge of the released jacket material, and that the unsheathed rods, before a charge wise removal, are post-treated in the grinding chamber. Upon the grinding operation in the ball mill, cylindrical grinding bodies effectively impact the jacket material to release the same without damaging the carrier rods. The jacket material is continuously ground off and advantageously accelerated by the fluid and conveyed off more rapidly than would occur through discharge by gravity from the grinding chamber. As a result, several steps of the method may be carried out more rapidly, supported by vibration of the mill: namely, the removal of the dust of the unsheathed rods or the moist detachment of sheathing residues; the neutralization after chemical detachment; and the drying after a wet treatment in the grinding container, without the rods having to be transported or rearranged, and before the rods are removed, chargewise, for reuse directly or conveyed to a storage container ready for reuse. According to a further feature of the invention, the flowing fluid may be a gas. This is particularly of advantage when the rods, dry and blown free from dust, may be conveyed to a new use because the dust removal is effected concurrently with the jacket removal operation by the gaseous transporting medium.

It is further provided that the fluid be a liquid, with the advantage that the transporting medium is able to enhance, in addition to the accelerated discharge of the jacket material, also the release or disintegration thereof and, with relatively hard sheathings, their detachment. In addition to the discharge of the detached jacket material, without change of media, a time saving washing operation is performed on the rods.

If it is further provided that a chemically reacting agent suitable for the after-treatment is utilized as the flowing fluid, the detachment of residues of the jacket material and adhesions thereof may be obtained. In this case, and quite advantageously, according to the composition of the jacket material, a base or acidic liquid, or the injection of a chemically active mist, into the flowing fluid, contributes to the detachment or release of the jacket material and/or accelerating the detachment.

According to a further feature of the invention, it is provided that a neutral medium be utilized alternately with a chemically reacting medium. This is of particular advantage when, after a liquid reaction phase, a neutralization and a drying of the cleansed or purified rod surface is necessary.

According to another feature of the invention, it is provided that the flowing medium be circulated and be freed from the solids carried thereby, and that the medium, if necessary be regenerated and/or heated, whereby the detached jacket material is continuously removed from the transporting medium in a solid separator, for example, by means of a cyclone or similar apparatus, and conveyed to the comminution state which is connected in series with the separator. Thereby, it is of advantage that the quantity of transporting medium present in the process remain small and need only be brought back to a degree of purity occasioned by the particular method, whereby an emission, for example of portions of dust in the environment or in the liquid transporting medium, may be prevented at little expense.

An apparatus adapted for carrying out the method comprises a ball mill which includes a grinding tube having at least one exchangeable grinding container, with the advantage that several grinding containers may be provided as rapidly exchangeable inserts which are adapted to the particular lengths of the carrier rods as charging containers, and through the exchangeability of the grinding containers contribute to the acceleration of the charging operation. In addition, the grinding containers may be exchanged according to the course of treatment provided. Thereby, it is of advantage that the exchangeable grinding container is constructed as a grate or grid and is centered with a wedge-ring tension element, in that additional locating and fitting operations are unnecessary upon the introduction of a new grinding container. An adaptation of the grinding containers to the length of the carrier rods to be processed is possible in that the grinding container is closed with rapid-closure covers having attachments which project different distances into the container in order to permit no axial shifting and crossing of the rods, and to thus prevent damage to the rods during the grinding operation.

According to another feature of the invention, the grinding tubes or pipes of the apparatus are equipped with several conduits which are uniformly distributed in the lower area of the grinding pipe sleeve over the length of the sleeve for conveying off the flowing fluid and, of course, the broken jacket material being transported by the fluid. Through this distribution of the discharge conduits, a continuous withdrawal of the broken pieces of jacket material may take place with a gaseous transporting medium, as well as with a liquid transporting medium and the broken pieces are accelerated along the shortest path toward a separator and a subsequent comminution stage. Thereby, advantageously the grinding operation is intensified and completed in a shorter time, and in addition the efficiency of a washing operation, rinsing operation or drying operation is improved by the zone wise passage of the particular medium.

BRIEF DESCRIPTION OF THE DRAWING

Other objects, features and advantages of the invention, its organization, construction and operation will be best understood from the following detailed description of a preferred embodiment of the invention, taken in conjunction with the accompanying drawings, on which.

DESCRIPTION OF THE PREFERRED EMBODIMENTS

Figure 1:
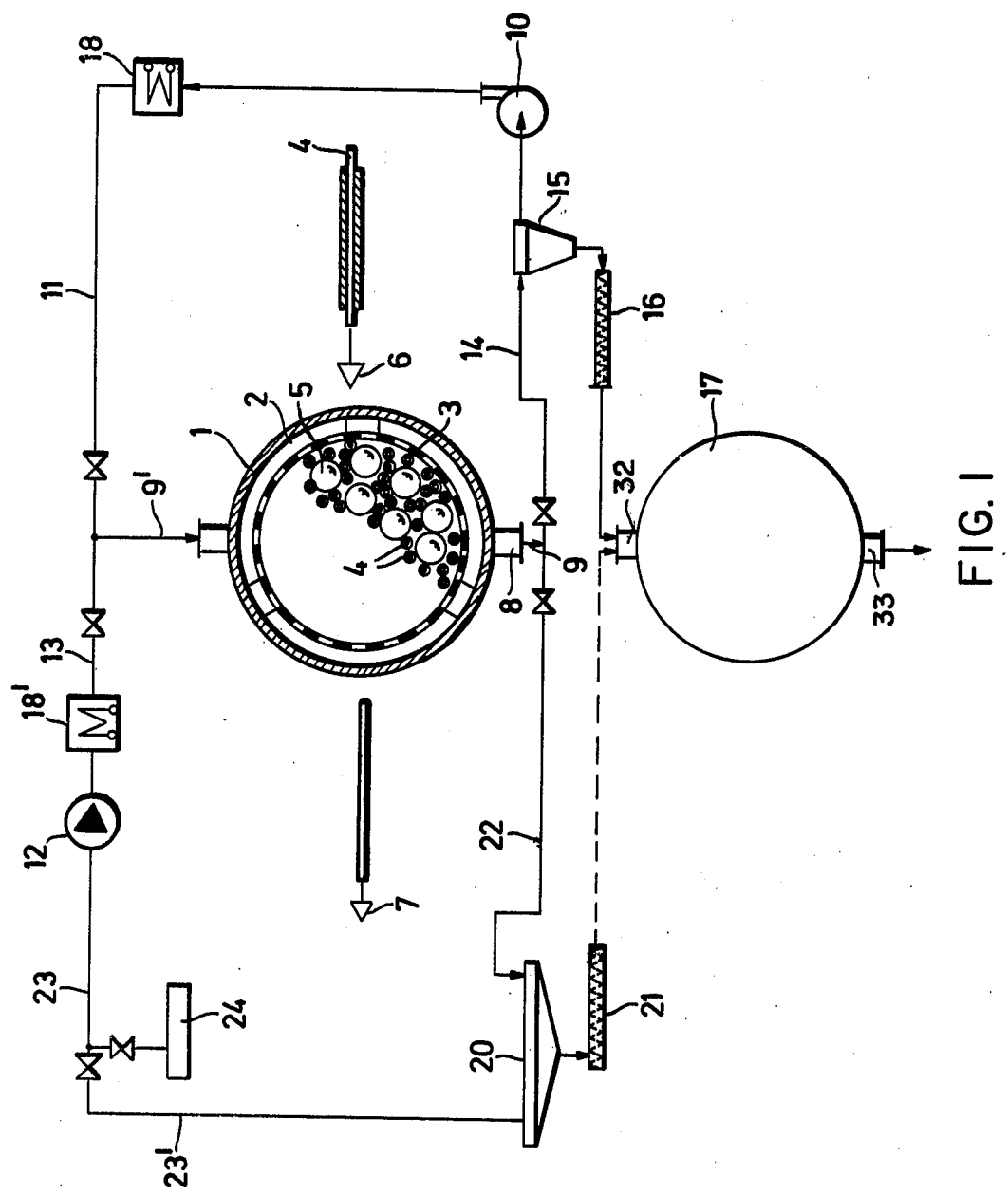
FIG. 1 illustrates, in section, a ball mill containing jacketed welding rods and cylindrical grinding rods, a schematic representation of a gas circuit for supporting a flow of gas through the ball mill, and a schematic representation of a liquid circuit for supporting a flow of liquid through the ball mill, the gas and liquid circuits being further connected to a subsequent comminution stage for further grinding treatment of the broken pieces of jacketed material.

Referring to FIG. 1, a ball mill is illustrated as comprising a grinding pipe 1 having located therein a grinding container 3 which is spaced from the pipe 1 by means of an annular chamber 2. The grinding container 3 may be constructed of a mesh grating so as to be perforate and have openings therein for the passage of the ground jacket material. The grinding container 3 contains jacketed rods 4 which are constituted, for example, by waste welding electrodes, and equally long cylindrical grinding bodies 5, which under the influence of the impulses introduced by an oscillatory drive (not shown) causes the detachment of the jacket material from the carriers rods. It is desirable that not only the jacket material be recovered for recycling, but also the relatively long carrier rods are to be recovered without damage, that is, unsheathed, straight and without squeezing. The chargewise delivery (in the grinding containers) of the waste welding electrodes into the grinding container is symbolically illustrated by the arrow 6, while the chargewise removal of the unsheathed rods (initially still in the grinding container) is symbolically illustrated by the arrow 7, the rods being delivered either directly back for receiving a new jacket or stored in a container ready for receiving a new jacket.

The ground pieces of jacket material are continuously discharged from the annular chamber 2 through discharge pipes 8 which are distributed along the lower side of the grinding pipe 1 and are further comminuted in a grinding stage 17 to the fineness required for the preparation of a new sheathing, and then conveyed to the material preparation stage (not shown).

In order to accelerate the discharge of the broken pieces of jacket material, either a liquid or gas transport medium is provided, with whose aid the ground particles are appreciable accelerated, whereby the grinding operation is intensified and shortened. With tests related to the shortening of the grinding operation, with a suitable filling of waste electrodes, in one particular case, the grinding duration could be reduced from a gravity operation of 15 minutes to less than 5 minutes by utilizing the present invention with a forced discharge. Accordingly, the grinding operation was reduced to less than one-third.

The carrier rods must, however, be freed of tightly adhering jacket residue, or also from a dust coating, and in order to attain a chemically pure surface, the rods are subsequently treated in a suitable manner, that is, washed and dried. For this purpose, the washing operation is advantageously to be carried out with agents determined as to the chemical composition of the jacket material and suitable for the rod surface so that the entire, necessary after-treatment is completed in the ball mill, without an intermediate transport of material being necessary. In this connection, appreciable costs related to work time of operating personnel are saved and there is a saving in transportation time over techniques heretofore used, by means of which the regeneration of the rods may be carried out economically, although the introduction and removal of the rods must be carried out in charges. An apparatus for carrying out the detachment process is provided for this purpose with several discharge conduits 8 which are uniformly distributed on the lower side of the grinding pipe 1, with which a gas conduit 14 and a liquid conduit 22 may be selectively connected. Inasmuch as one skilled in the art would readily appreciate the interconnection of several of the conduits 8 with the conduits 14 and 22 by means of additional sections of conduit and by means of the illustrated valves, or suitable equivalence thereof, the same will not be further discussed herein. This also applies to the other valves illustrated in the upper portion of the drawing, whose operation will be readily apparent to those skilled in the art.

A gas circulation system is diagrammatically illustrated on the right-hand side of the drawing, and a liquid circulation system is illustrated on the left-hand side of the drawing.

A stream of gas is fed to an input conduit 9' of the ball mill grinding pipe 1 by means of a blower 10 and a conduit 11, or a stream of liquid is fed to the conduit 9' by means of a pump 12 through a conduit 13. Suitably, the gaseous medium is freed from the discharge portions of solids and supplied anew to the grinding container 3. For this purpose, a cyclone separator 15 is provided in the conduit 14 as a solids separator, the solid material being discharged from the cyclone separator 15 through a gas-tight feed device 16 for the continuous discharge of solids to the subsequent comminution stage 17 which is connected in series with the separator 15. The gas-tight feed device 16 may be, for example, a worm conveyor. In each of the circulating systems a respective heat exchanger 18, 18' may be provided to heat the flowing medium. Thus, for example, for the drying of the rods after a washing operation or for the acceleration of a chemical reaction, and indeed when the grinding operation is to be shortened by means of the addition of rapidly reacting agents, or when such agents are required for a surface treatment, the heat exchangers 18 may be energized. The pump 12 feeds a liquid, for example, water, through the conduit 13 and the conduit 9' into the grinding pipe 1. With the aid of this liquid, the ground jacket pieces are conveyed off at 9 from the discharge conduits 8 to the conduit 22. The broken pieces of jacket material are then deposited in a solids separator 20 and, by way of a conveyor device 21, are continuously forwarded through a conduit (illustrated by a broken line) to the comminution stage 17 for the fine grinding operation. Again, the conveyor 21 may be a worm conveyor. The rinsing liquid or washing liquid is drawn off by the pump 12 from a storage container 24, or through the conduit 23' in the clarified portion of the solids separator 20. In this connection, it is of advantage that the quantity of liquid found in circulation, after the solids separation, may be inserted again upon the removal of sludge. In this manner, the use of a liquid medium is limited, which is particularly favorable when an expensive agent must be utilized. The utilization of a chemically reacting medium as the transporting means, provided in any case upon the after-treatment, is of advantage when its chemical properties support the grinding operation, whereby the additional investment for separate conveying apparatus and switching apparatus required for the transfer switching operation upon change from transporting medium to an after-treatment medium, may be saved, by means of equalization of the after-treatment medium as the transporting medium.

The carrier rods to be prepared for reuse, particularly the welding electrodes which have been separated out as waste, occur in different lengths. In one case, standard rod lengths necessary for recycling are, for example, 450, 550, 650, 700, 800, 900, 1050 mm. The grinding of the jackets of the carriers rods takes place by means of the elongate grinding rods 5 which are of the same length as the carrier rods which are to be unsheathed. As long as the carrier rods and the grinding rods cannot be deflected in the axial direction they roll against one another whereby the jacket material is quickly separated due to the oscillatory impulses. Upon shifting of the rods in the axial direction, in the case of detachment on one side of the jacket, crossing and interconnecting may easily occur, whereby the carrier rods of the welding electrodes become bent or deflected. Such rods are then no longer suitable for receiving a new jacket. It is therefore necessary that the grinding container be adaptable to the different lengths of the carrier rods to be processed. Advantageously, in order to reduce the number of the grinding containers to be held ready, and in order to be able to equalize intermediate dimensions, according to a particular feature of the invention the grinding container is closed with rapid-closure covers, each having a different length attachment which projects into the grinding part, occasioned by means of the grinding pipe and its final tolerance. Each attachment to the cover is, according to the invention, of a diameter adapted to tightly close to the internal diameter of the grinding container in order to prevent a locking of the rods. Through the longer attachment fixed to the cover, the grinding chamber is so shortened in axial length, that the rods retain only a small permissible axial play in order not to be able to cross or interconnect. In the aforementioned group of standard lengths, with three differently long cover attachments and two grinding container lengths, the grinding containers are inserted for eight different lengths of electrodes.

The grinding pipe 1 is equipped with several attachment conduits 8 for the attachment of the discharge pipe conduits 9, the conduits 8 being connected centrally of each section of the grinding pipe and therefore distributed in the lower area of the grinding pipe sleeve uniformly in the axial direction. Through this distribution of the discharge conduits, the detached jacket material may be removed along the shortest path and with the greatest speed, without the individual broken pieces of jacket having to be moved along mutually retarding on long chutes to the ends of the pipe. At the same time, and quite advantageously, additionally the wear on the apparatus is appreciably reduced, and therewith the life of the grinding pipe is extended. According to a further feature of the invention, the exchangeable grinding container 3 is constructed as a grate or as a cylindrical sieve and is centered with a wedge-ring tension element, whereby the surface of the grinding container 3 which is subjected to wear may advantageously be turned in order to prevent wear on one side. With the aid of a wedge-ring tension element, the centering of the grinding container is made possible rapidly and accurately, and the grinding container exchange may be carried out in a shorter time.

A more detailed description will now be given with respect to the ball mill and the rapid closure structure.

Figure 2:
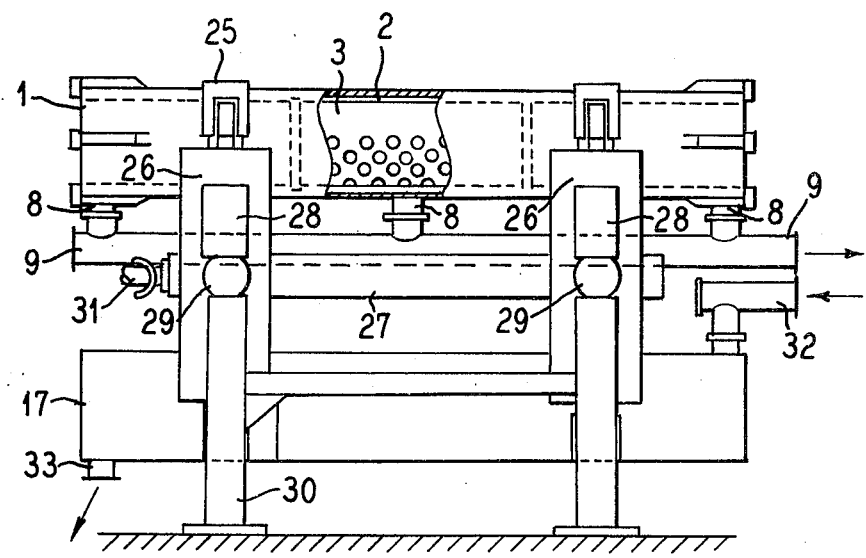
FIG. 2 is a side elevation, shown partially in section, of a ball mill, generally known per se, adapted for carrying out the present invention.

FIG. 2 illustrates a ball mill which is known per se, comprising two parallel grinding tubes 1 and 17, which are fixedly connected by clamping yokes 25 to a carrier frame. The carrier frame comprises two legs 26 and a connecting tube 27. On the sides of the legs 26 are brackets 28 through which, and via rubber springs 29, the unit comprising the grinding tubes and carrier frame is supported for oscillation of a stand 30.

In the interior of the legs 26 are located imbalance masses, which are connected to a coupling shaft by the connecting tube 27. The drive of this oscillating arrangement takes place by means of a motor (not illustrated on the drawing), through a drive shaft 31. The grinding tube 1 contains a number of grinding containers 3 which are arranged spaced from the grinding tube wall within the tube 1 so that an annular chamber 2 results between the inner wall of the grinding tube 1 and the outer wall of the grinding container 3. This annular chamber 2, by way of three material outlet pipes 8, is connected with a collection conduit 9 which serves for conveying off the released jacket material. The collection conduit 9 passes into the conduits 22 (FIG. 1) or 14 (FIG. 1), each according to whether the jacket material is conveyed by a liquid medium or a gaseous medium. The jacket material separated from the carrier medium passes through the conduit 32 for further comminution. In this manner, the fineness of the jacket material is attained for a subsequent preparation. The jacket material comminuted to the final degree of fineness is discharged from the grinding tube 17 by means of an outlet conduit 33.

In order to charge the ball mill, a grinding container 3 is filled with rod-shaped grinding bodies 5 (FIG. 1) and the rod-shaped carriers 4 (FIG. 1) which are to be unsheathed, and the grinding container is placed into the grinding tube 1. During the operation of the ball mill, a loosening of the jacket material takes place and the material, through the chamber 2 and supported by the flowing carrier medium, is continually discharged. After conclusion of the unsheathing process, the grinding containers 3 are removed from the grinding tube 1, so that the rod-shaped carriers may be removed from the grinding containers.

Figure 3:
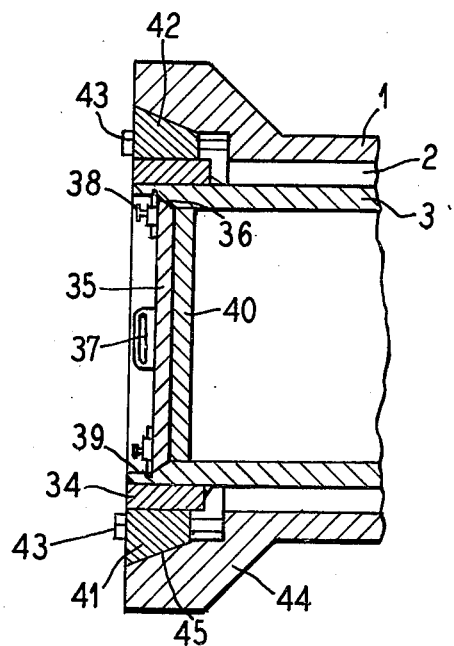
FIG. 3 is a sectional view showing a rapid closure structure for a grinding container.

An end area of a grinding tube 1 with a grinding container 3 is illustrated in an enlarged view in FIG. 3. A free chamber 2 separates the inner side of the grinding tube 1 from the outer side of the grinding container 3, which supported on its end facing the end area of the grinding tube 1 on a ring 34. The ring 34 is advantageously welded to the grinding container 3. Such a support is provided at both ends of the grinding container 3 when its length corresponds to that of the grinding tube 1. In other cases, the support must be carried out in the interior of the grinding tube 1 on spacing members and supporting shoes, so that in the free chamber 2, the released jacket material is free to move from the carriers to the grinding tube 1.

The grinding container 3 has a rapid closure cover 35 which fits with its outer contours in that portion of the grinding tube 1 which is conically shaped on its inner side in a small area 36. The cover 35 is provided with a handle 37 for easier removal from the grinding container 1 and for arresting in the grinding container several slide members 38 which are in engagement with a corresponding recess 39 of the grinding tube 1.

In order to be able to easily adapt the axial length of the inner chamber of the grinding container 1 to the different dimensions of the rod-shaped carrier to be unsheathed, particularly in order to be able to equalize intermediary dimensions of the carrier, the grinding container 3 is equipped on one or both sides with rapid closure covers 35, which are provided with exchangeable attachments 40 of the same or different length projecting into the grinding container 3.

Each attachment 40 on the cover 35 is, according to the invention, adapted in diameter so as to connect closely with the diameter of the grinding container rim. Through the attachment 40 fixed on the cover, the grinding container is advantageously shortened in axial length so that the rods may only have a small axial play. In the case that each grinding container 3 is closed on one end with a rapid closure cover 35, for which three cover attachments 40 of different length are available, (and the grinding container can be used without the cover attachment 40, with only two different grinding container lengths, eight different lengths of electrode may be treated, because of the possibilities of combination between grinding container length and the three different thicknesses of the attachment 40.

The grinding container 3 is centered in the grinding tube 1 by means of a keyway ring clamping element 41 which is known per se. The element 41 is located, in each case, in the end area of the grinding tube 1 and comprises a ring element 42 and a plurality of screws 43, with which the ring element 42 is fastened to the grinding tube 1. The grinding tube has a widened portion 44 whose inner side, that is in the direction toward the end of the grinding tube 1, is conically widened in an area 45. The conicity of the grinding tube 1 corresponds to a conicity of the outer contour of the ring element 42. By tightening the screw 43 a sliding of the corresponding conical surfaces on one another results, and in this manner radial pressure forces exerted on the ring 34, as well as a center, and also an axial fixation of the grinding container 3 occurs in the grinding tube 1. Advantageously, the possibility of turning the surface of the grinding container 3 which is subjected to wear is made possible, in order to prevent wear of the container on one side. With the aid of the keyway ring clamping element 41, the centering of the grinding container 3 and an exchange of the grinding containers may be carried out rapidly and accurately.

Although we have described our invention by reference to specific illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Apparatus for removing the jacket material from jacketed rods, comprising:
    a vibratory ball mill including an outer tube, a grinding container in and spaced from said tube having a perforate wall, said container having cylindrical grinding bodies therein of the same length as the jacketed rods, at least one fluid inlet to said tube and at least one fluid outlet from said tube; and
    a fluid circuit connected to said inlet and said outlet, including a fluid pump for delivering a flow of fluid through said container, a solids separator connected between said outlet and said pump.

2. The apparatus of claim 1 wherein said fluid circuit comprises a heat exchanger for heating the fluid.

3. The apparatus of claim 1, comprising:
    a fine grinding stage connected to receive the solids from said separator.

4. The apparatus of claim 3, comprising:
    a conveying device connected between said separator and said fine grinding stage.

5. The apparatus of claim 1, wherein the fluid is a gas and said pump is a blower.

6. The apparatus of claim 1, wherein the fluid is a liquid and said pump is a liquid pump.

7. The apparatus of claim 1, wherein said fluid circuit is a liquid circuit and said solids separator separates solids from the liquid flow, and further comprising a gas circuit connected to said inlet and said outlet including a gas-solids separator.

8. The apparatus of claim 7, wherein said gas-solids separator comprises a cyclone separator.

9. The apparatus of claim 1, wherein said grinding container is removably mounted in said tube for alternation with other like containers.

10. The apparatus of claim 9, wherein said grinding container includes a cover having replaceable attachments of different lengths to extend into and define different internal lengths within said container to accommodate different lengths of rods.

11. The apparatus of claim 9, comprising:
    wedge-ring means mounting said container within and spaced from the inner surface of said tube.

12. The apparatus of claim 1, comprising:
    a plurality of discharge conduits spaced uniformly along the lower side of said tube.

* * * * *